United States Patent
Nozaki et al.

(10) Patent No.: US 9,403,513 B2
(45) Date of Patent: Aug. 2, 2016

(54) PARKING BRAKE APPARATUS

(71) Applicant: KAWASAKI JUKOGYO KABUSHIKI KAISHA, Hyogo (JP)

(72) Inventors: Takuma Nozaki, Aioi (JP); Teruaki Yamamoto, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 253 days.

(21) Appl. No.: 14/058,584

(22) Filed: Oct. 21, 2013

(65) Prior Publication Data
US 2015/0107400 A1 Apr. 23, 2015

(51) Int. Cl.
*B60T 7/10* (2006.01)
*B60T 11/04* (2006.01)
*B60T 11/06* (2006.01)

(52) U.S. Cl.
CPC ............... *B60T 7/104* (2013.01); *B60T 11/046* (2013.01); *B60T 11/06* (2013.01); *Y10T 74/20438* (2015.01)

(58) Field of Classification Search
CPC ............... Y10T 74/20396; Y10T 74/2042; Y10T 74/20612; Y10T 74/20582; Y10T 74/20438; B60T 7/102; B60T 11/046
USPC .............. 74/501.6, 502.4; 188/2 D, 10, 24.11
See application file for complete search history.

(56) References Cited

U.S. PATENT DOCUMENTS

| | | | | |
|---|---|---|---|---|
| 1,524,342 A * | 1/1925 | De Ruyter | ............... | B60T 11/04 188/10 |
| 5,065,643 A * | 11/1991 | Axtell | ............... | B60T 7/108 74/501.6 |
| 5,277,081 A * | 1/1994 | Brown | ............... | B60T 7/105 296/208 |
| 5,303,609 A * | 4/1994 | Iwanaga | ............... | B60T 7/105 74/501.6 |
| 5,829,314 A * | 11/1998 | Scura | ............... | B60T 11/06 188/24.11 |
| 6,298,744 B1 * | 10/2001 | Huang | ............... | B60T 11/06 74/489 |
| 7,445,092 B2 * | 11/2008 | Tachiiri | ............... | B60T 13/746 188/2 D |
| 7,603,925 B2 * | 10/2009 | Murase | ............... | B60T 7/045 74/473.16 |
| 8,857,288 B2 * | 10/2014 | Sano | ............... | F16C 1/101 74/502.4 |
| 2014/0224601 A1 * | 8/2014 | Yamanaka | ............... | B60T 7/085 188/204 R |

FOREIGN PATENT DOCUMENTS

| | | | | |
|---|---|---|---|---|
| JP | 5-4564 | | 1/1993 | |
| JP | 9-267788 | * | 10/1997 | ............... B60T 11/06 |
| JP | 2013-6514 | * | 1/2013 | ............... B60T 11/06 |

OTHER PUBLICATIONS

English Abstract of JP 9-267788, Mitsugi et al., Oct. 1997.*
English Abstract of JP 2013-6514, Yoshihiro et al., Jan. 2013.*

* cited by examiner

*Primary Examiner* — Vinh Luong
(74) *Attorney, Agent, or Firm* — Wenderoth, Lind & Ponack, L.L.P.

(57) ABSTRACT

A parking brake apparatus includes a base plate, a brake lever supported by the base plate, a pair of left and right brake actuating units, and left and right brake cables connecting between the brake lever and the left and right brake actuating units, respectively. The base plate has an elongated hole extended from a corresponding position to a cable connecting portion of the brake lever toward the outer cable holding portion, left and right inner cables of the pair of left and right brake cables are connected to a common inner cable by an equalizer, and the common inner cable is extended inside the elongated hole from the cable connecting portion toward the outer cable holding portion.

7 Claims, 12 Drawing Sheets

PARKING BRAKE APPARATUS

BACKGROUND OF THE INVENTION

1. Field of the Invention

The present invention relates to a parking brake apparatus of a vehicle, and particularly to a parking brake apparatus suitable for a utility vehicle.

2. Description of the Prior Art

Generally, a parking brake apparatus includes a brake actuating unit, such as a brake caliper and the like, a brake lever arranged in a vicinity of a driver's seat, and a push-pull type brake cable connecting the brake actuating unit and the brake lever to each other.

FIG. 13 shows a parking brake apparatus disclosed in Japanese Patent Laid-Open Publication No. H05-004564, in which a base plate 202 for supporting a brake lever is fixed to a vehicle body frame 200 via a bracket 201, and has a lever pivot 203 at an upper end portion of the base plate 202 and an outer cable holding portion 204 at a lower end portion thereof. A brake lever 210 is pivotably supported by the lever pivot 203, and outer cables 210La, 210Ra of left and right brake cables 210L, 210R are fixed to the outer cable holding portion 204.

Left and right inner cables 210Lb, 210Rb are upwardly extended from upper ends of the outer cables 210La, 210Ra, respectively, to be connected to front and rear end portions of an equalizer 211. A center portion in a fore-and-aft direction of the equalizer 211 and the brake lever 210 are connected therebetween by a link 216.

In the conventional example in FIG. 13, upper end portions of both of the outer cables 210La, 210Ra supported in the outer cable holding portion 204, both of the inner cables 210Lb, 210Rb protruding from both of the outer cables 210La, 210Ra, the equalizer 211, and the common link 216 are all arranged at a one side of left and right sides of the base plate 202. This arrangement requires a large component arrangement space to be secured at the one side of the base plate 202, and thereby, a lack of compactness remains as an unsolved problem. In addition, since a bending load is applied to the one side surface side against the base plate 202 when a brake is operated, it is necessary to increase a thickness of the base plate 202.

SUMMARY OF THE INVENTION

The present invention has been made in view of the problems described above, and an object thereof is to provide a parking brake apparatus in which a structure in a vicinity of a brake lever can be made lightweight and compact.

To achieve the above object, an aspect of the present invention provides a parking brake apparatus including a base plate attached to a vehicle body frame, a brake lever pivotably supported in a lever supporting portion of the base plate, a pair of left and right brake actuating units arranged at left and right wheels, respectively, and a pair of left and right brake cables connecting between the brake lever and the left and right brake actuating units, wherein the base plate has an outer cable holding portion integrated with the base plate at an end portion of an opposite side of the lever supporting portion, and has an elongated hole extended from a corresponding position to a cable connecting portion of the brake lever toward the outer cable holding portion, left and right inner cables of the pair of left and right brake cables are connected to a common inner cable by an equalizer, and the common inner cable is extended inside the elongated hole from the cable connecting portion toward the outer cable holding portion.

According to the present invention, the outer cable holding portion is formed integrally with the base plate, and the common inner cable extended from the cable connecting portion of the brake lever is arranged inside the elongated hole formed in the base plate. This arrangement allows reduction of the number of components for a parking brake, easy assemblability, and compactness. In addition, this makes it possible to simply and properly determine an attachment position of an outer cable relative to the brake lever (a degree of tensile strength of the inner cable).

The parking brake apparatus according to the aspect of the present invention is preferably provided with a configuration as below.

(a) A cross section of the outer cable holding portion is formed in an L shape.

With this configuration, supporting rigidity of the outer cable is improved to enhance a brake performance.

(b) End portions of the left and right outer cables are fixed to the outer cable holding portion, the equalizer is arranged inside the elongated hole, the left and right inner cables protruding from the left and right outer cables are connected to both end portions of the equalizer, and the common inner cable is connected to a center portion of a left-and-right width of the equalizer.

In this arrangement, the left and right brake cables are branched left and right by the equalizer arranged in the vicinity of the brake lever. When the brake is operated, an operation load is branched left and right substantially-immediately after the brake lever to be transmitted to the left and right brake actuating units in rear portions of the vehicle. This causes less flexure in the middle of brake cables to maintain a high level of brake performance. Further, this enhances durability of the brake cable.

(c) In the elongated hole, a width of a region corresponding to a range in which the equalizer moves is made wider than a width of a region at a side of the brake lever.

Accordingly, even with slight vibration or a deflection of an inner cable, the equalizer is prevented from interfering with the base plate to smoothly move inside the elongated hole, and to provide a comfortable brake operation.

(d) A common outer cable assembled by the left and right outer cables is fixed to the outer cable holding portion at a center portion of a left-and-right width corresponding to the base plate, and the common inner cable is inserted into the elongated hole from the common outer cable to reach the cable connecting portion. In this case, more preferably, a vicinity portion of the brake lever of the elongated hole is formed in an arcuate shape around the lever supporting portion.

Accordingly, in the parking brake apparatus in which a common brake cable is extended to the rear portion of the vehicle and is branched left and right therein, the vicinity of the brake lever can be made compact, and can be supported with a high rigidity. The cable connecting portion moves arcuately around the lever supporting portion as a pivotal center when the brake lever is pivoted. Since an end portion of the elongated hole is formed in the arcuate shape along the movement locus, the brake lever is pivotally operated without being interfered by the base plate.

(e) A steering wheel device is arranged at a left side region of the vehicle, and the brake lever is arranged at a left side of the steering wheel device.

This allows a parking brake operation to be performed, preventing a passenger in an assistant driver's seat from becoming an obstruction. In a vehicle having a three-seater configuration, in particular, the effect is enhanced.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE INVENTION

First Embodiment of the Present Invention

A first embodiment of the present invention will be described below with reference to FIGS. 1 to 8. The present embodiment adopts a utility vehicle as a vehicle. For convenience of description, a traveling direction of a vehicle will be described as a "front side" of the vehicle and respective components, and a left-and-right direction viewed from a passenger will be described as a "left-and-right direction" of the vehicle and the respective components.

Figure 1:
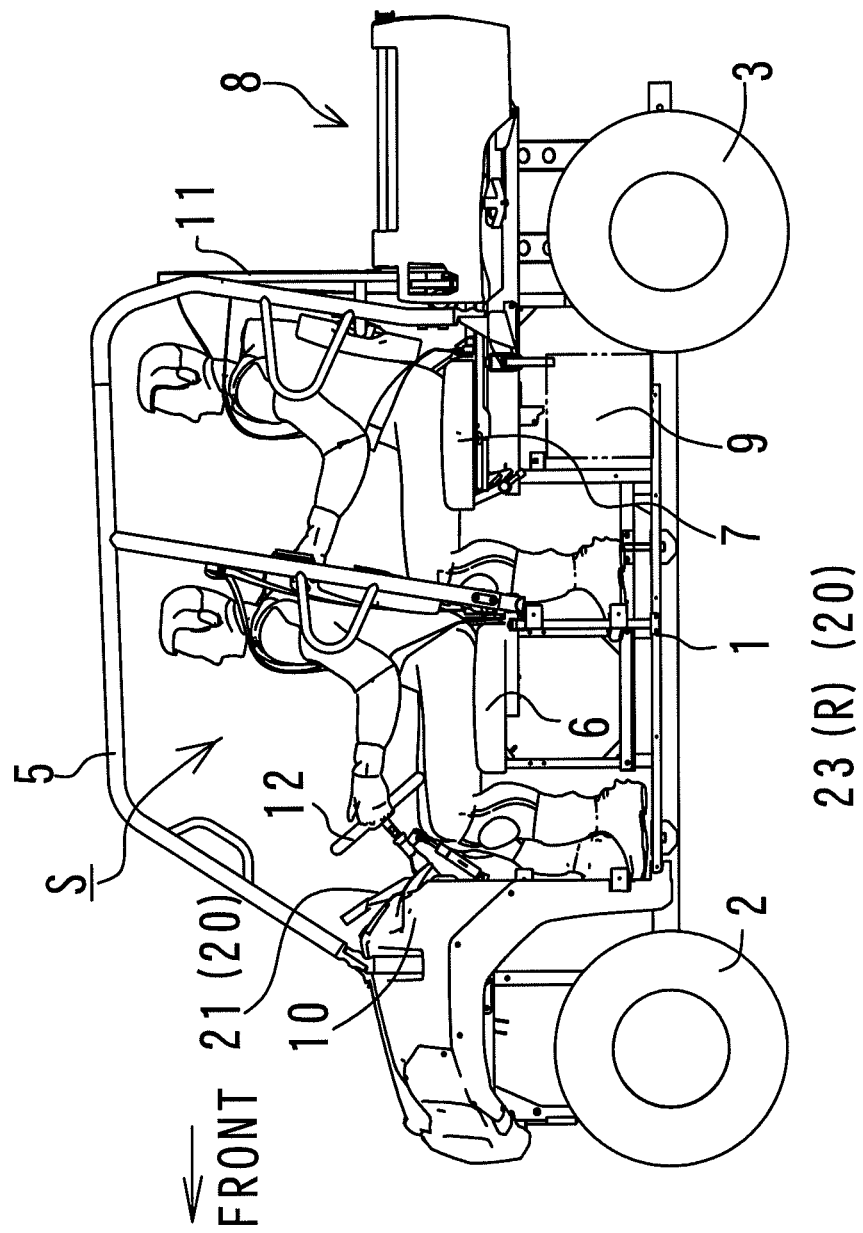
FIG. 1 is a left side view of a utility vehicle having a parking brake apparatus according to a first embodiment of the present invention.

In FIG. 1, a pair of left and right front wheels 2 is provided in a front portion of a vehicle body frame 1, and a pair of left and right rear wheels 3 is provided in a rear portion of the vehicle body frame 1. A passenger or riding space S between the front wheels 2 and the rear wheels 3 is surrounded by a ROPS 5. ROPS stands for Rollover Protective Structure. There are arranged a three-seater front seat 6 in a front half portion of the passenger space S and a three-seater rear seat 7 in a rear half portion of the passenger space S, and there is provided a cargo bed 8 behind the rear seat 7. An engine (shown with virtual line) 9 is arranged at a lower side of the rear seat 7. A screen 11 is arranged between the rear seat 7 and the cargo bed 8. A steering wheel device 12 and a brake lever 21 of the parking brake apparatus 20 are arranged at a dashboard 10 of a front end portion of the passenger space S. A bonnet 15 is provided at a front side of the dashboard 10.

Figure 2:
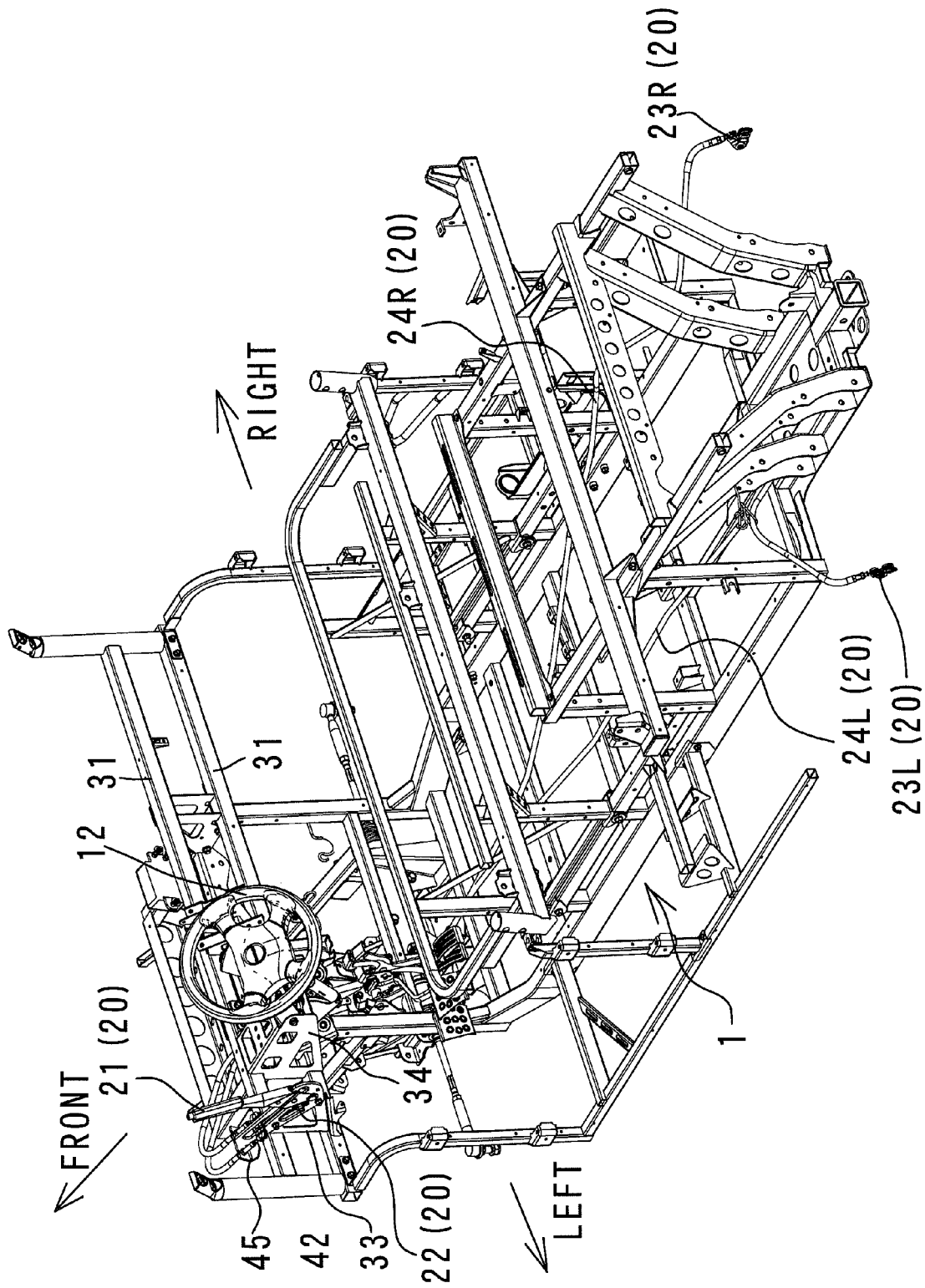
FIG. 2 is a perspective view of a vehicle body frame of the utility vehicle of FIG. 1.

In FIG. 2, the steering wheel device 12 is arranged at a left side region of the vehicle, i.e., at a front side of a left side driver's seat, and the brake lever 21 and a base plate 22 supporting the brake lever 21 are arranged at a further left side of the steering wheel device 12.

The parking brake apparatus 20 includes the brake lever 21, the base plate 22, left and right brake actuating units (e.g., brake caliper) 23L, 23R, and push-pull type left and right brake cables 24L, 24R connecting the left and right brake actuating units 23L, 23R and the brake lever 21 to each other.

Figure 3:
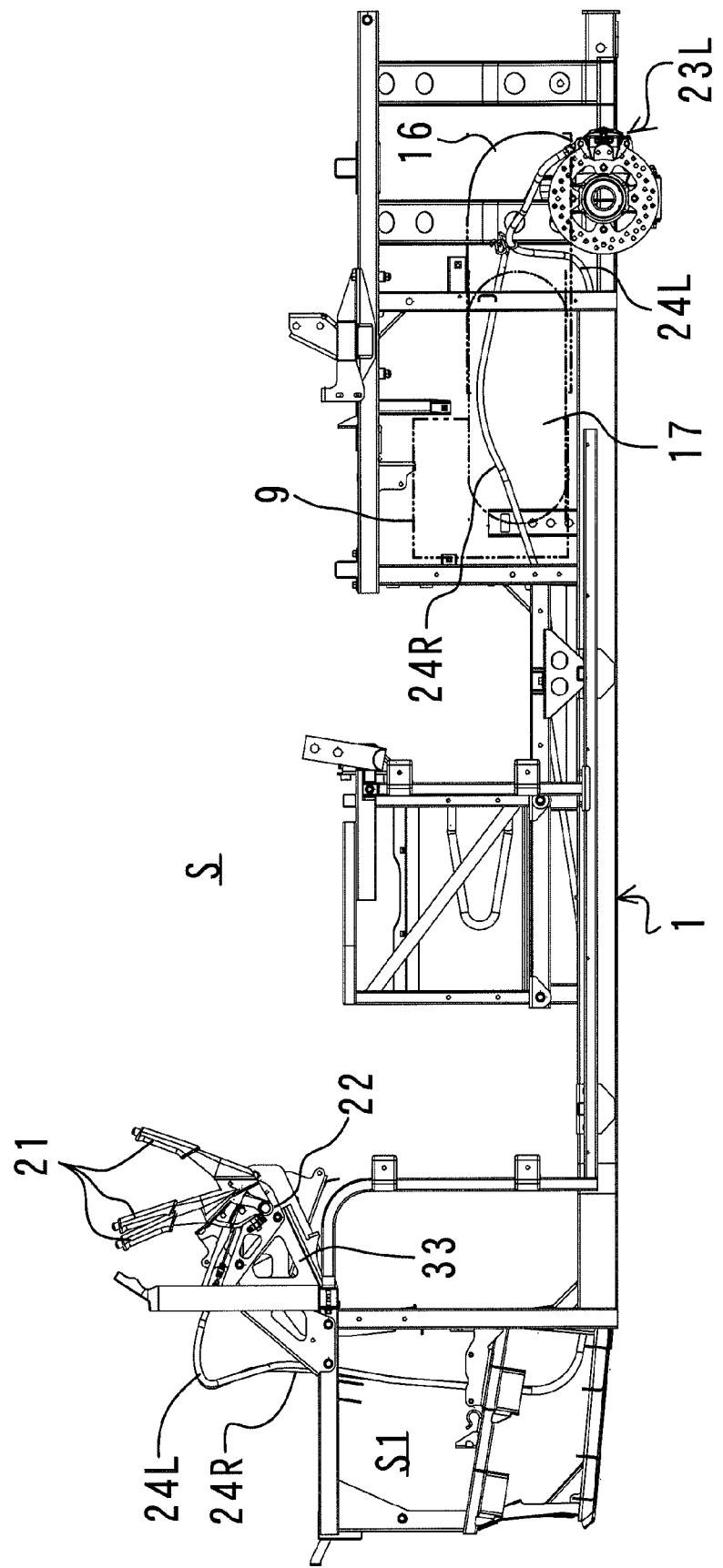
FIG. 3 is a left side view of the vehicle body frame of FIG. 2.

In FIG. 3, a gear type transmission 16 is arranged at a rear side of the engine 9, and the engine 9 and the gear type transmission 16 are power-transmittably connected to each other by a V belt type continuously variable transmission 17 arranged at a left side surface thereof. The left and right brake cables 24L, 24R are right-downwardly curved from a front end portion of the base plate 22, and are downwardly extended inside a bonnet space S1, to reach a bottom portion of the vehicle body frame 1.

Figure 4:
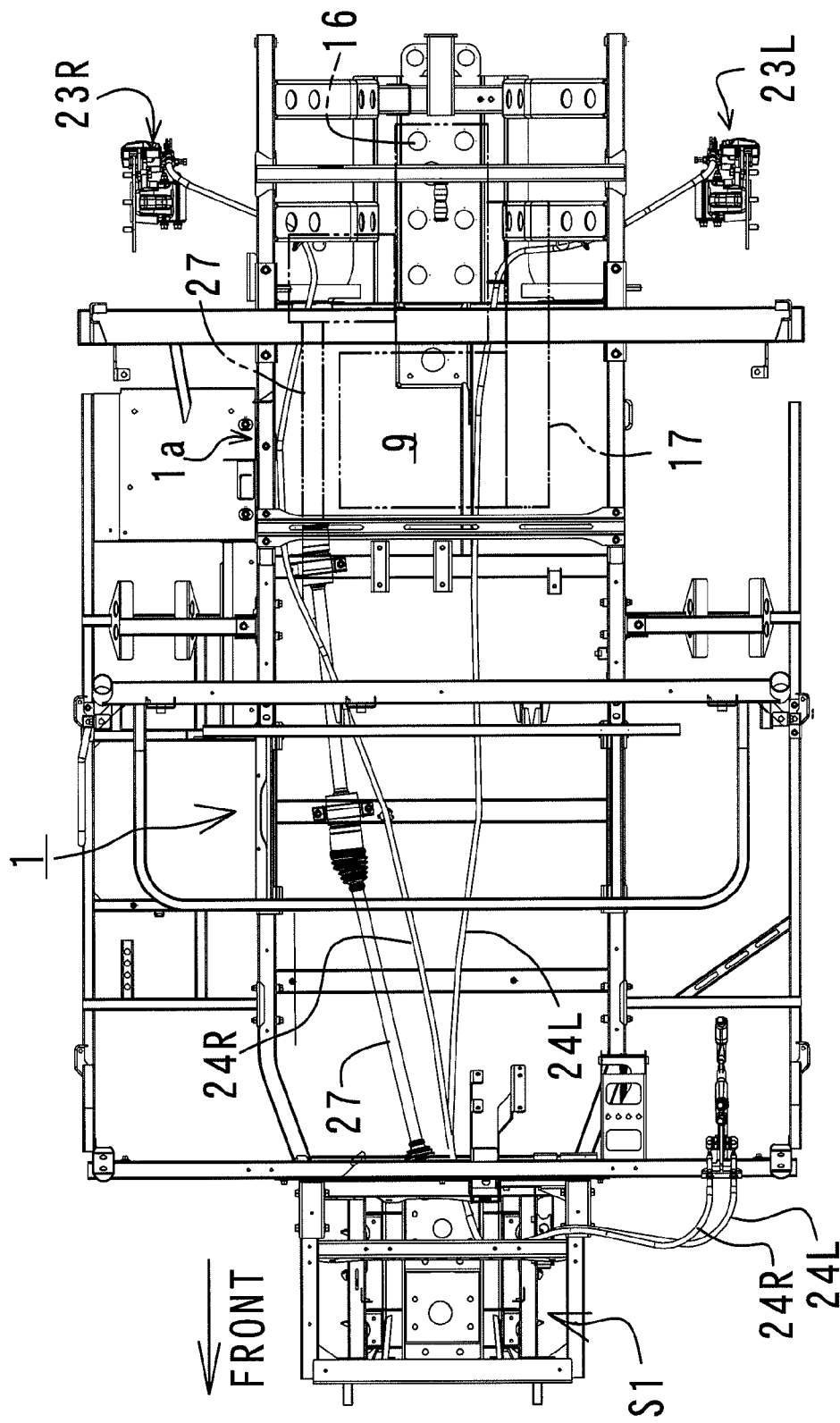
FIG. 4 is a plan view of the vehicle body frame of FIG. 2.

In FIG. 4, the left and right brake cables 24L, 24R are rearwardly curved at a center portion in a vehicle width direction of a bottom portion of the bonnet space S1. The left brake cable 24L is rearwardly extended substantially parallel to a fore-and-aft direction along an upper surface of the bottom portion in a substantially center portion in the vehicle width direction of the vehicle body frame 1, and turns to a left side in a vicinity of the gear type transmission 16, to connect to the left brake actuating unit 23L. On the other hand, the right brake cable 24R is right-rearwardly extended from the center portion substantially parallel to a drive shaft 27 for the front wheels, and then, is rearwardly extended along a right frame member 1a of the vehicle body frame 1, after crossing over the drive shaft 27 to a right side thereof. Further, the right brake cable 24R turns to a right side in a vicinity of a front portion of the gear type transmission 16 to be connected to the right brake actuating unit 23R.

Figure 5:
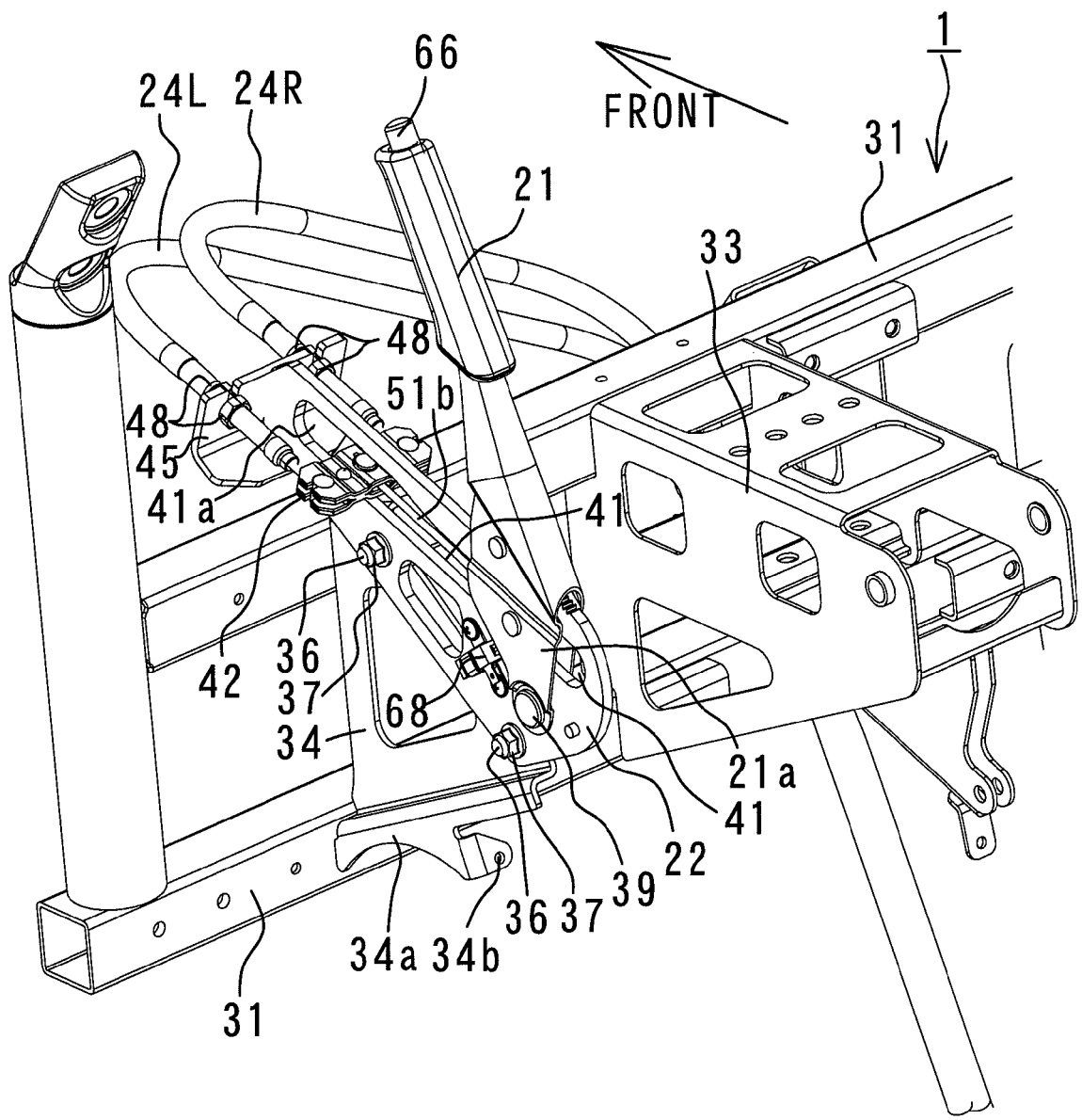
FIG. 5 is a perspective view of a brake lever and its vicinity of the parking brake apparatus of FIG. 1.

In FIG. 5, the vehicle body frame 1 has upper and lower cross pipes 31 for the dashboard at a front upper end portion, and a steering wheel device attachment bracket 33 and a brake lever attachment bracket 34 are fixed to the cross pips 31 by welding.

The brake lever attachment bracket 34 is arranged in a substantially vertical flat surface along a fore-and-aft direction, and is formed in a substantially triangular shape as viewed from a side. A front edge side of the attachment bracket 34 is substantially vertically formed, and upper and lower end portions of the front edge side are fixed to the upper and lower cross pipes 31 by welding. A lower edge side of the attachment bracket 34 is upwardly inclined toward a rear, and has a folding portion 34a with an S-shaped cross section integrated therewith in order to enhance rigidity. Incidentally, the folding portion 34a has a boss portion 34b integrated therewith in order to attach another structural member. An upper edge side of the attachment bracket 34 is downwardly inclined toward a rear, and the base plate 22 is fixed to the upper edge side with a pair of front and rear bolts 36 and a pair of front and rear nuts 37.

The base plate 22 is formed long and narrow along the upper edge side of the attachment bracket 34, and a lower end portion of the brake lever 21 is pivotably supported in a lower portion of a rear end portion of the base plate 22 via a support pin 39. In the base plate 22, there is formed an elongated hole 41 extended along a longitudinal direction of the base plate 22 from the rear end portion to a front end portion of the base plate 22, and an equalizer 42 for branching a brake cable is inserted into the elongated hole 41 movably in a longitudinal direction of the elongated hole 41. In a front end of the base plate 22, an outer cable holding portion 45 in an L-shape as viewed from a side is integrally formed with the base plate 22. Incidentally, the outer cable holding portion 45 is fixed to the base plate 22 by welding, so that the outer cable holding portion 45 can also be configured to be formed integrally with the base plate 22.

Figure 7:
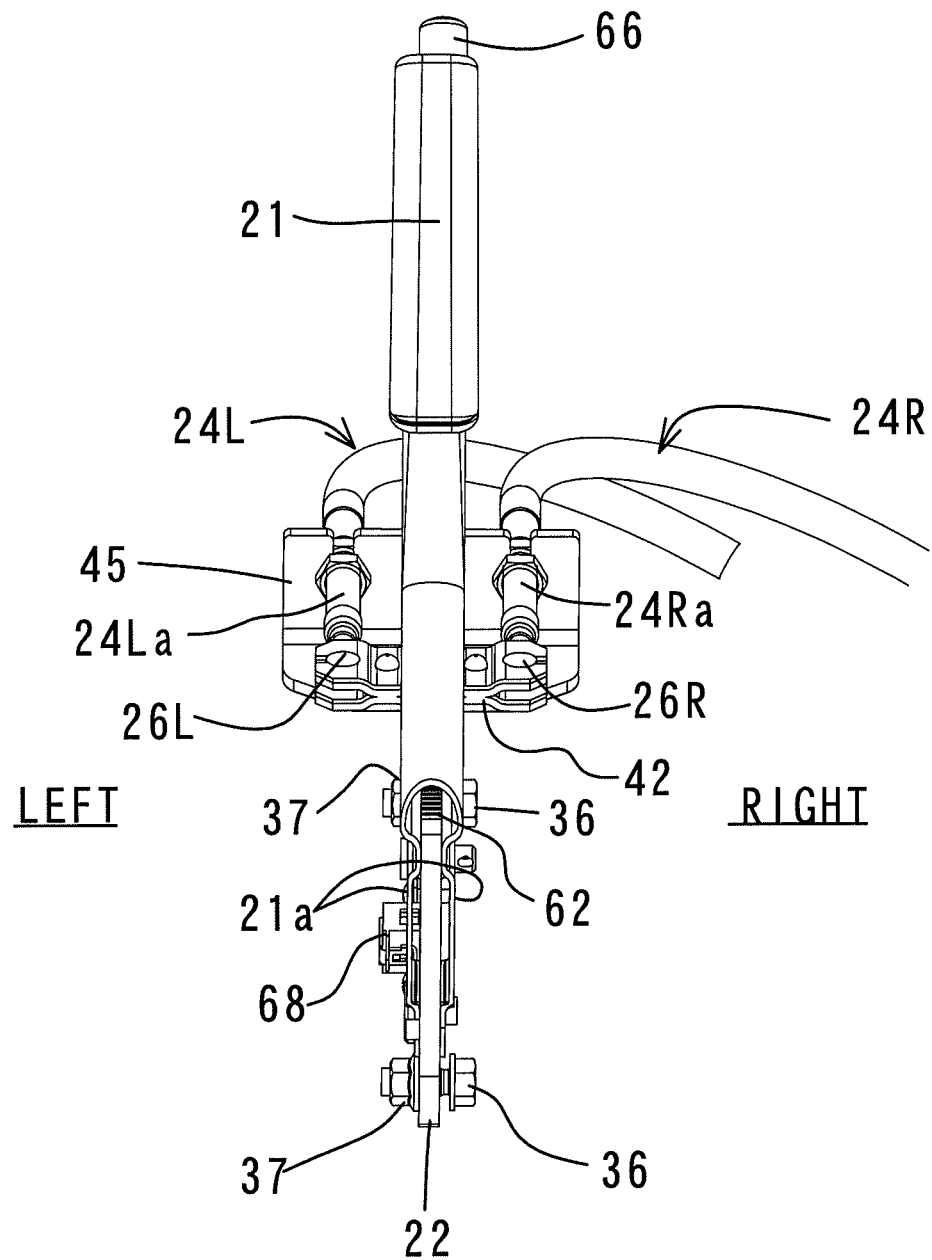
FIG. 7 is a front view of the brake lever and the like of FIG. 5.

In FIG. 7, a lower portion 21a of the brake lever 21 is formed in a U shape as viewed from a rear side by bending a sheet metal member, and then the base plate 22 is inserted into the U-shaped lower portion 21a.

Figure 6:
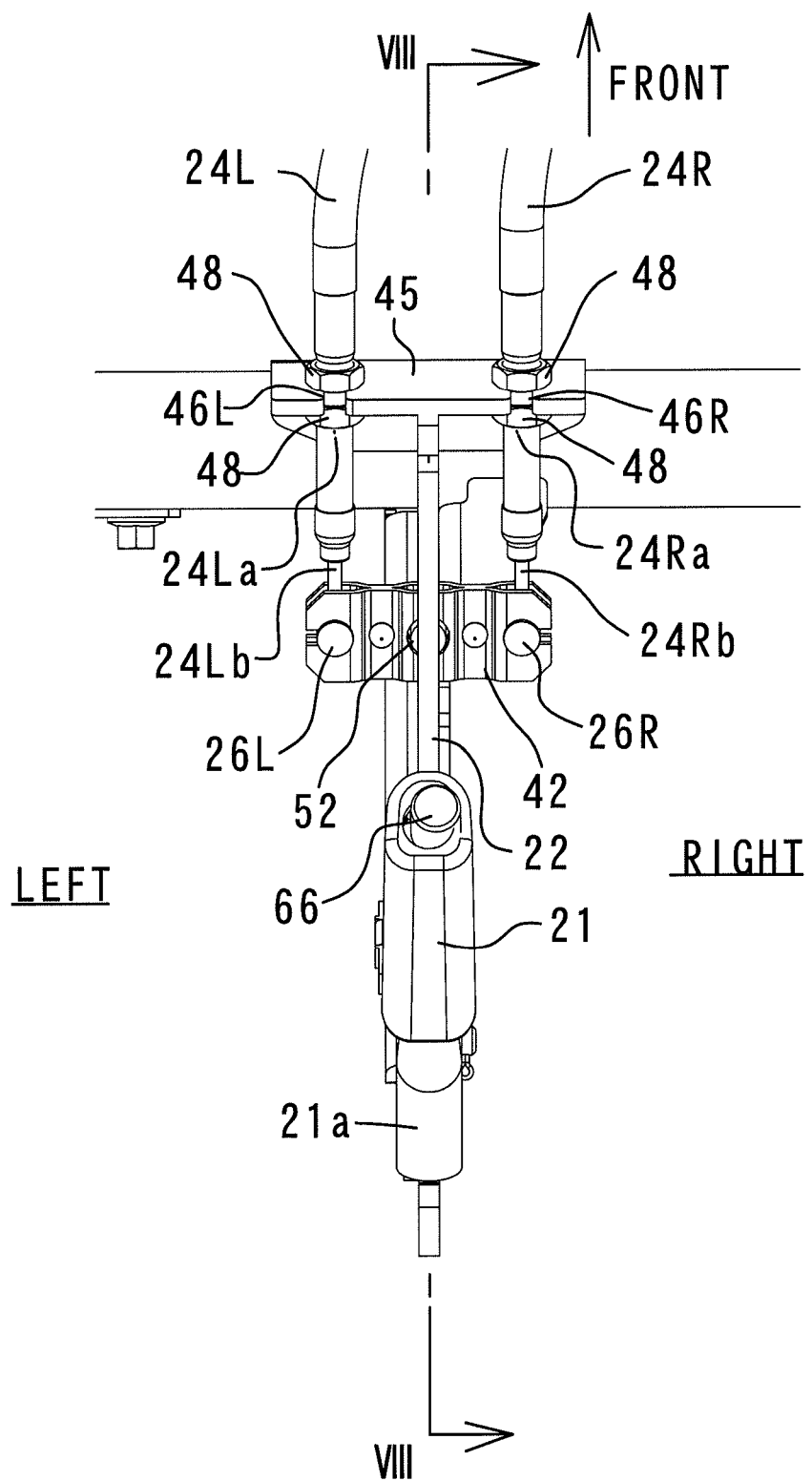
FIG. 6 is a plan view of the brake lever and the like of FIG. 5.

In FIG. 6, the outer cable holding portion 45 formed in the front end of the base plate 22 is substantially symmetrically extended from the base plate 22 to both sides of the vehicle width direction, and thereby, the front end of the base plate 22 is configured in a T shape as viewed from an upper side. In a left side region of the base plate 22 in the outer cable holding portion 45, there is formed a left support hole 46L, and a left outer cable 24La of a left brake cable 24L is supported in the left support hole 46L. In a right side region of the base plate 22 in the outer cable holding portion 45, there is formed a right support hole 46R, and a right outer cable 24Ra of a right brake cable 24R is supported in the right support hole 46R. The outer cables 24La, 24Ra are fixed position-adjustably in a fore-and-aft direction to the outer cable holding portion 45 with respective front and rear adjust nuts 48.

Rear end portions of the left and right outer cables 24La, 24Ra are rearwardly extended only by a certain length from the outer cable holding portion 45, and left and right inner cables 24Lb, 24Rb protrude rearwardly in left and right side regions of the base plate 22 from rear ends of the outer cables 24La and 24Ra, respectively. Rear end portions of the inner cable 24Lb and 24Rb are provided with cylindrical locking members 26L, 26R for connection, respectively.

The equalizer 42 is extended to both sides of the vehicle width direction so as to be substantially symmetrical relative to the base plate 22, and the locking members 26L, 26R of the rear ends of the left and right inner cables 24Lb, 24Rb are pivotably connected to locking holes formed in both of left and right end portions of the equalizer 42, respectively.

Figure 8:
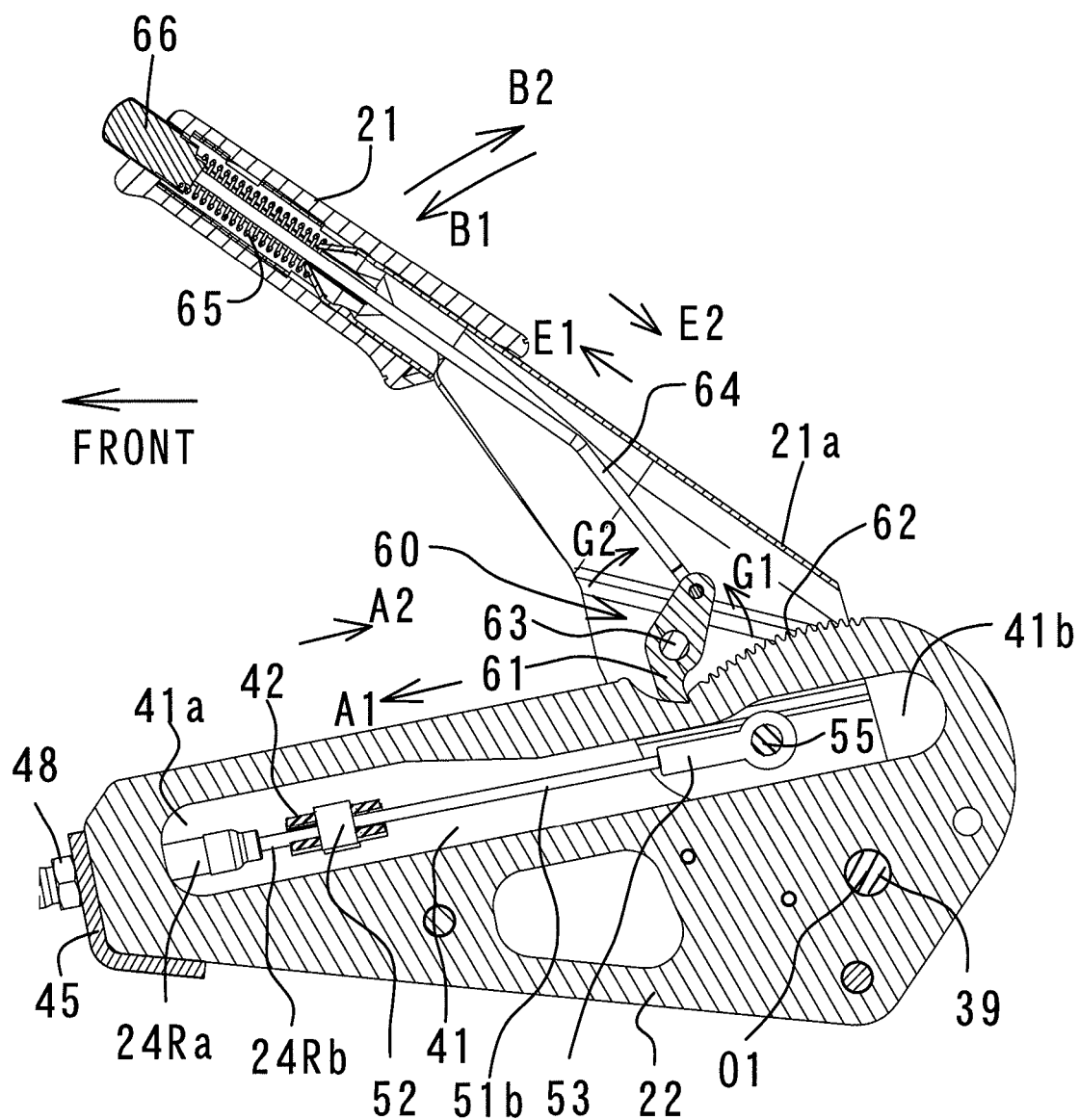
FIG. 8 is a VIII-VIII cross-sectional view of FIG. 6.

In FIG. 8, a cylindrical locking member 52 of a common inner cable 51b is pivotably connected to a locking hole formed in a center portion of the vehicle width direction of the equalizer 42. The common inner cable 51b is rearwardly extended inside an elongated hole 41 along a longitudinal direction of the elongated hole 41, and a ring fitting 53 fixed to a rear end portion of the common inner cable 51b is pivotably connected to a connecting pin (lever connecting portion) 55 of the brake lever 21. Of course, the ring fitting 53 and the connecting pin 55 are also arranged inside the elongated hole 41. A width of a vertical direction of a front half portion 41a of the elongated hole 41 is larger (wider) than a width of a vertical direction of a rear half portion 41b, such that the equalizer 42 can smoothly move inside the elongated hole 41, without contacting a peripheral edge of the elongated hole 41.

There is provided a ratchet mechanism 60 configured with a ratchet claw 61 and multiple ratchet teeth 62 between the brake lever 21 and the base plate 22, and the ratchet mechanism 60 allows the brake lever 21 to be stopped at a desired pivotal position in an engaged state. The ratchet teeth 62 are formed in an upper edge of a rear end portion of the base plate 22 along a circumference around a lever shaft center O1, and the ratchet claw 61 is pivotably supported by the brake lever 21 via a support pin 63. A lower end of the ratchet claw 61 is engageable with the ratchet teeth 62, and an upper end of the ratchet claw 61 is connected to a connecting rod 64. The connecting rod 64 is extended toward a head portion of the brake lever 21 inside the brake lever 21, and a tip portion of the connecting rod 64 is connected to a lock release button 66 provided in the head portion of the brake lever 21. The lock release button 66 is biased in an arrow E1 direction by a coil spring 65 compressed inside the brake lever 21. Biasing the lock release button 66 and the connecting rod 64 in the arrow E1 direction biases the ratchet claw 61 in an arrow G1 direction, and thereby, a lower end of the ratchet claw 61 is engaged with the ratchet teeth 62.

The left and right inner cables 24Lb, 24Rb are pulled in an arrow A1 direction in FIG. 8 by an elastic force of brake springs arranged in the brake actuating units 23L, 23R, and thereby, the brake lever 21 is pulled in an arrow B1 direction to be stopped, for example, in a brake release position.

As shown in FIG. 5, in the base plate 22, there is arranged a brake state detection switch 68 opposed from a front lower side to a front edge of the lower portion 21a of the brake lever 21, and in the brake release position, the front edge of the lower portion 21a of the brake lever 21 abuts to the brake state detection switch 68 to transmit a parking brake release signal to a brake indicator (not shown). For example, the brake indicator is adapted such that while a lamp is lit in a brake operation state, the lamp is switched off in a brake release state.

Descriptions will be made for operation and action of the parking brake apparatus. At a time of parking, the brake lever 21 is pivoted just by a proper extent in an arrow B2 direction (rear-upwardly pivoted) from a brake release state in FIG. 8. At this time, even if the lock release button 66 is not pressed, the lower end of the ratchet claw 61 crosses over the ratchet teeth 62 against an elastic force of the coil spring 65 to move rearwardly. After a driver pivots the brake lever 21 just by a proper extent and releases a hand from the brake lever 21, the ratchet claw 61 automatically engages with the ratchet teeth 62 in a corresponding position to hold the brake lever 21 in the pivotal position as described above.

As described above, when pivoting the brake lever 21 in the arrow B2 direction pulls the common inner cable 51b in an arrow A2 direction, the equalizer 42 moves rearwardly inside the front half portion 41a of the elongated hole 41 to equally pull the left and right inner cables 24Lb, 24Rb in the arrow A2 direction.

Accordingly, the left and right brake actuating units 23L, 23R shown in FIG. 4 are in a brake ON state to stop the left and right rear wheels 3.

When brake is released, the lock release button 66 is pressed in a state where the brake lever 21 is slightly pulled in the arrow B2 direction, so that the ratchet claw 61 is disengaged from the ratchet teeth 62 to make the brake lever 21 automatically return to the brake release position.

Effects of Embodiment (1) The outer cable holding portion 45 is formed integrally with the base plate 22, and the common inner cable 51b is arranged inside the elongated hole 41 formed inside the base plate 22. This arrangement reduces the number of parking brake components, and achieves simple assemblability and compactness. In addition, this also makes it possible to simply and properly determine an attachment position of the outer cables 24La, 24Rb relative to the brake lever 21 (a degree of tensile strength of the inner cables 24Lb, 24Rb).

(2) A cross section of the outer cable holding portion 45 is formed in an L shape, which improves supporting rigidity of the outer cables 24La, 24Ra to enhance a brake performance.

(3) End portions of the left and light outer cables 24La, 24Ra of the left and right brake cables 24L, 24R are fixed to the outer cable holding portion 45, the equalizer 42 is arranged inside the elongated hole 41, the left and right inner cables 24Lb, 24Rb are connected to both end portions of the equalizer 42, and the common inner cable 51b is connected to a center portion of a left-and-right width of the equalizer 42. With this arrangement, at a time of brake operation, an operation load is branched left and right substantially-immediately after the brake lever 21, to be transmitted to the left and right brake actuating units 23L, 23R in rear portions of the vehicle. Accordingly, this causes less flexure in the middle of the brake cables 24L, 24R to maintain high level of a brake performance. Further, this enhances durability of the brake cables 24L, 24R.

(4) In the elongated hole 41 formed in the base plate 22, the width in a vertical direction of the front half portion 41a in which the equalizer 42 moves is made wider than the width in a vertical direction of the rear half portion 41b. Therefore, even with slight vibration or a deflection of the inner cable 51b, the equalizer 42 is prevented from interfering with the base plate to smoothly move inside the elongated hole 41, so that this can provide a comfortable brake operation.

(5) The steering wheel device 12 is arranged at the left side region of the vehicle, and the brake lever 21 is arranged at the further left side of the steering wheel device 12. This allows a parking brake operation to be performed, preventing a passenger in an assistant driver's seat from becoming an obstruction. In a vehicle having a three-seater configuration, in particular, the effect is enhanced.

Second Embodiment of the Present Invention

FIGS. 9 to 12 show a second embodiment of the present invention. A configuration thereof different from that of the first embodiment lies in the fact that the common brake cable 51 is extended from the brake lever 21 to a vehicle rear portion to be branched to the left and right brake cables 24L, 24R by the equalizer 42 in the vehicle rear portion. The other structure is basically the same as that of the first embodiment. Accordingly, the same reference numerals are given to denote the same components. Therefore, while a structure different from the first embodiment will be described in detail, the common structure will be described briefly.

Figure 9:
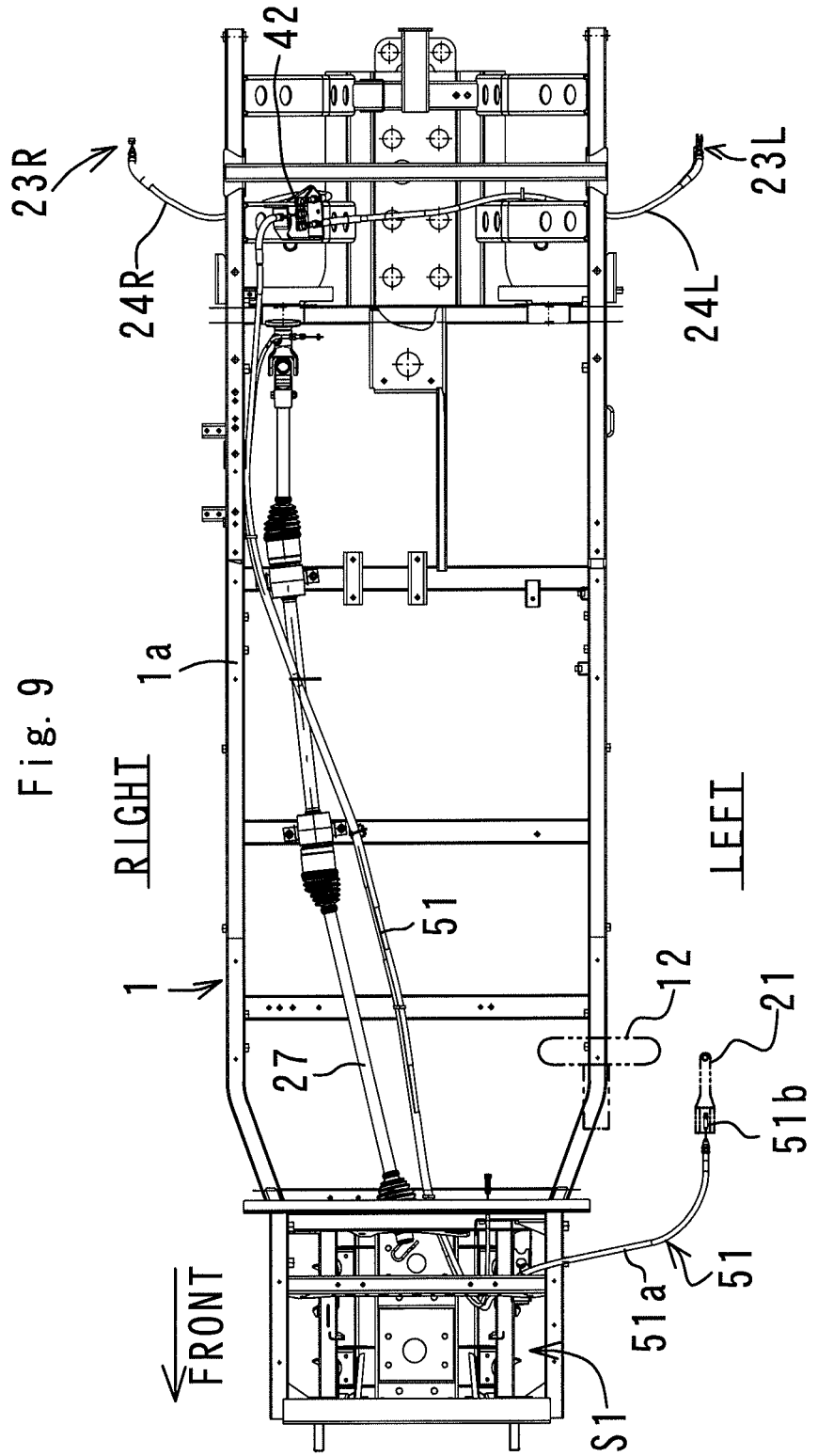
FIG. 9 is a plan view of a vehicle body frame similar to that in FIG. 3, according to a second embodiment of the present invention.

FIG. 9 is a plan view of a vehicle, in which the steering wheel device 12 is arranged at the left side region of the vehicle, and the brake lever 21 is arranged at the further left side of the steering wheel device 12. The common brake cable 51 is configured with the common inner cable 51b connected to the brake lever 21, and a common outer cable 51a. The common inner cable 51b is inserted in the common outer cable 51a. The common brake cable 51 protrudes frontwardly from the brake lever 21 and is right-downwardly curved, then is downwardly extended toward a center portion in the vehicle width direction inside the bonnet space S1, and then, is right-rearwardly extended from the center portion substantially parallel to the drive shaft 27 on an upper surface of a bottom portion of the vehicle frame 1. In the vehicle rear portion, the common brake cable 51 crosses over the drive shaft 27 to a right side, and reaches a vicinity of a right side rear wheel along the right main frame member 1a of the vehicle body frame 1.

Then, in a vicinity of the right side rear wheel 3, the common brake cable 51 is branched to the left brake cable 24L and the right brake cable 24R via the equalizer 42.

Figure 10:
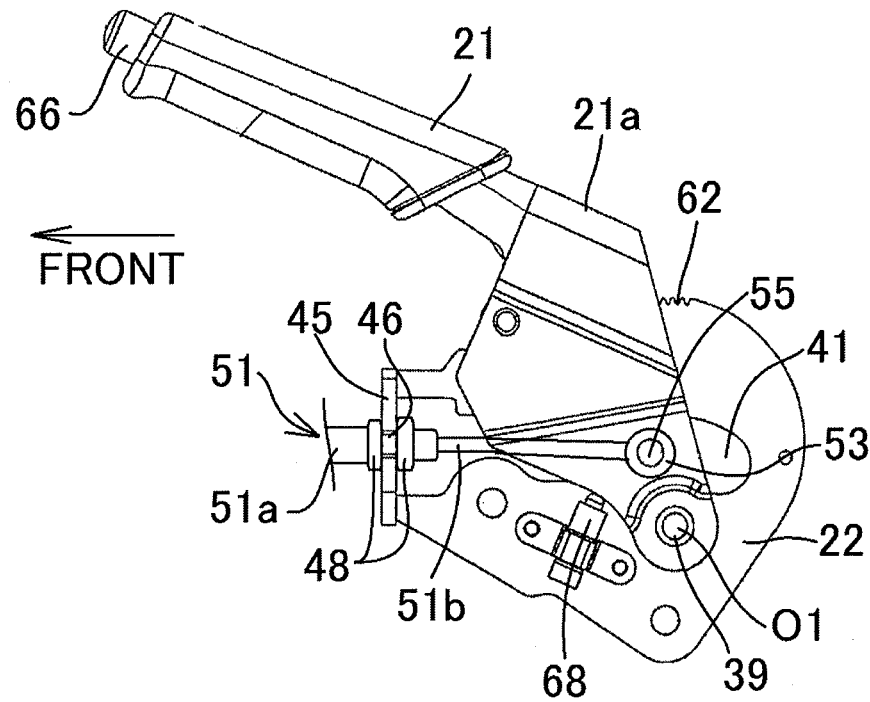
FIG. 10 is a left side view of a brake lever and its vicinity of a parking brake apparatus of the second embodiment.
Figure 11:
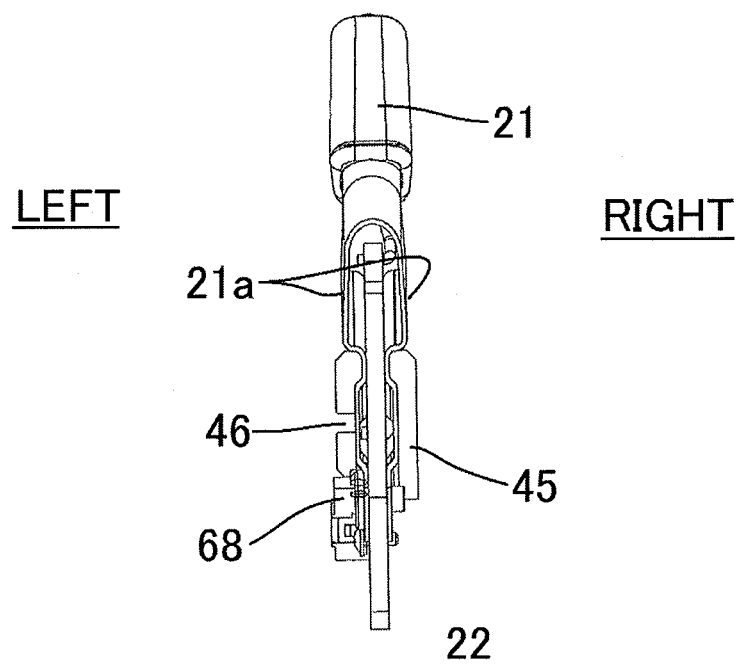
FIG. 11 is rear side view of the brake lever and the like of FIG. 9.

FIG. 10 is a left side view of the brake lever 21 and the base plate 22, in which the base plate 22 is formed short in length in a fore-and-aft direction as compared to that of the first embodiment, and the brake lever 21 is pivotably supported in the lower portion of the rear portion of the base plate 22 via the support pin 39. The base plate 22 has the elongated hole 41 reaching from the rear end portion of the base plate 22 to the outer cable holding portion 45 of the front end, and the rear end portion of the elongated hole 41 is formed in an arcuate shape along the circumference around the lever shaft center O1. The outer cable holding portion 45 is provided integrally with the base plate 22 at a front end of the base plate 22.

Figure 12:
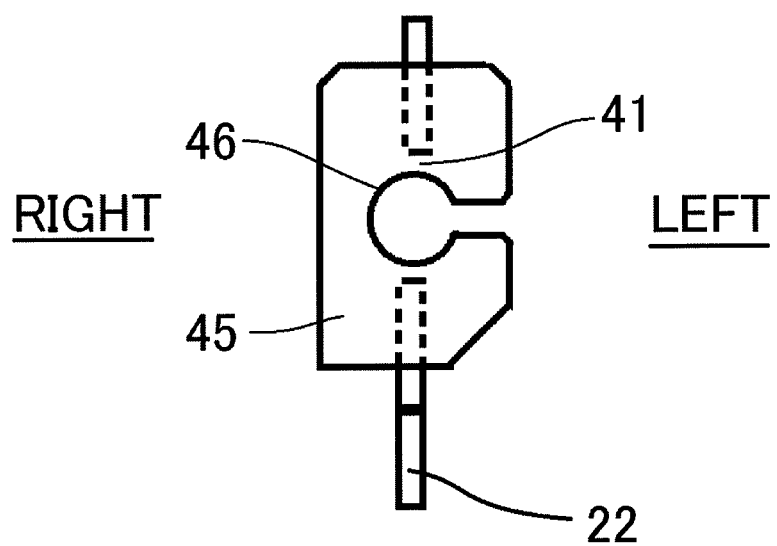
FIG. 12 is an enlarged front view of an arrow XII portion of FIG. 9.
Figure 13:
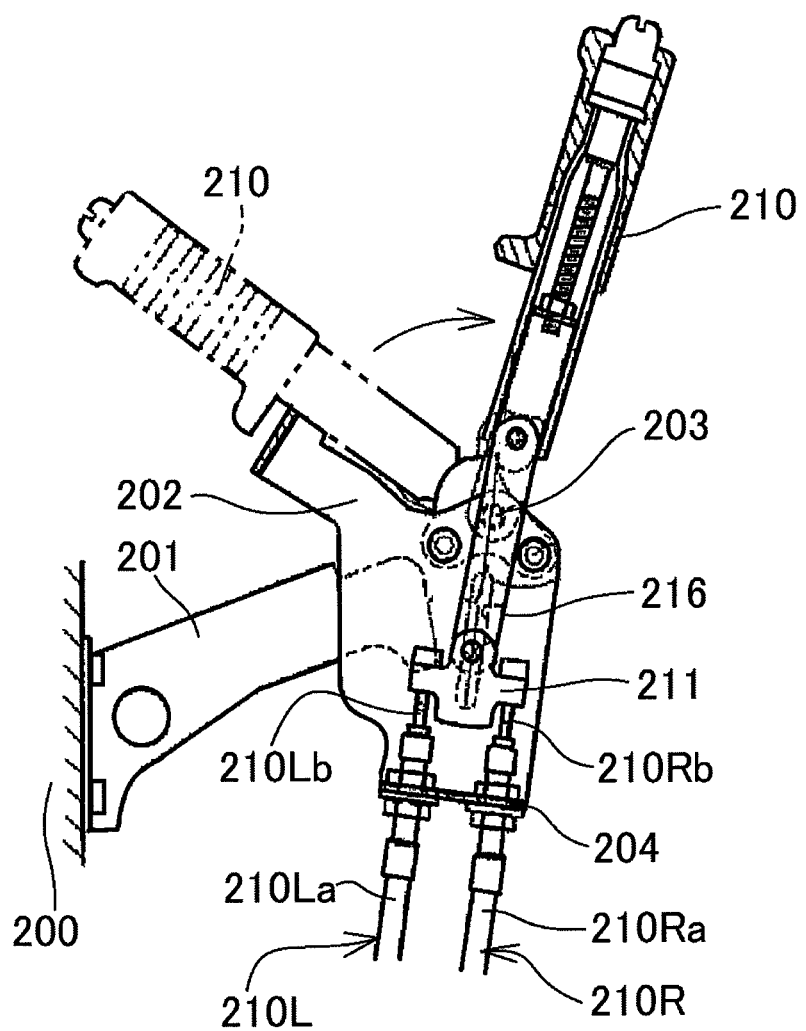
FIG. 13 shows a conventional parking brake apparatus.

FIG. 12 is an enlarged front view of the outer cable holding portion 45, in which a support hole 46 for supporting the outer cable is formed in a center portion in the vehicle wide direction, i.e., in a position overlapping the base plate 22 as viewed from a front side.

In FIG. 10, the common outer cable 51a is supported in the support hole 46 to be fixed position-adjustably in the fore-and-aft direction to the outer cable holding portion 45 with the front and rear adjust nuts 48.

The common inner cable 51b is rearwardly extended along the longitudinal direction of the elongated hole 41 from a rear end of the common outer cable 51a inside the elongated hole 41, and the ring fitting 53 fixed to the rear end portion of the common inner cable 51b is pivotably connected to the connecting pin 55 of the brake lever 21. Of course, the ring fitting 53 and the connecting pin 55 are also arranged inside the elongated hole 41.

Incidentally, there is provided the ratchet mechanism 60 configured with the ratchet nail (not shown) and multiple of the ratchet teeth 62 between the brake lever 21 and the base plate 22, in the same manner as the first embodiment, to stop and hold the brake lever 21 at the desired pivotal position. In addition, a head portion of the brake lever 21 is provided with the lock release button 66 releasing a lock of the ratchet mechanism 60.

An operation in the second embodiment is basically the same as that of the first embodiment, therefore, to provide the same effects. Besides that, in the second embodiment, extending the common brake cable 51 to the vehicle rear portion enables the arrangement space of the brake cable to be reduced.

Other Embodiment

The present invention is not limited to the structures of the foregoing exemplary embodiments, but includes various modifications to be made without departing from the spirit and scope of the disclosure as set forth in the following claims.

What is claimed is:

1. A parking brake apparatus comprising:
   a base plate attached to a vehicle body frame;
   a brake lever pivotably supported in the base plate via a support pin;
   a pair of left and right brake actuating units arranged at left and right wheels, respectively; and
   a pair of left and right brake cables connecting between the brake lever and the left and right brake actuating units, wherein
   the base plate has an outer cable holding portion integrated with the base plate at an end portion of an opposite side against the support pin, and has an elongated hole extended from a corresponding position to a cable connecting portion of the brake lever toward the outer cable holding portion,
   left and right inner cables of the pair of left and right brake cables are connected to a common inner cable by an equalizer,
   the common inner cable is extended inside the elongated hole from the cable connecting portion toward the outer cable holding portion, and
   the cable connecting portion and the common inner cable are movable inside the elongated hole.

2. The parking brake apparatus according to claim 1, wherein a cross section of the outer cable holding portion is formed in an L shape.

3. The parking brake apparatus according to claim 1, wherein
end portions of left and right outer cables of the pair of left and right brake cables are fixed to the outer cable holding portion,
the equalizer is arranged inside the elongated hole,
the left and right inner cables protruding from the left and right outer cables are connected to both end portions of the equalizer, and
the common inner cable is connected to a center portion of a left-and-right width of the equalizer.

4. The parking brake apparatus according to claim 3, wherein in the elongated hole, a width of a region corresponding to a range in which the equalizer moves is made wider than a width of a region at a side of the brake lever.

5. The parking brake apparatus according to claim 1, wherein
a common outer cable assembled by the left and right outer cables is fixed to the outer cable holding portion at a center portion of a left-and-right width corresponding to the base plate, and
the common inner cable protrudes from the common outer cable to reach the cable connecting portion.

6. The parking brake apparatus according to claim 5, wherein a vicinity portion of the brake lever of the elongated hole is formed in an arcuate shape around the support pin.

7. The parking brake apparatus according to claim 1, wherein
a steering wheel device is arranged at a left side region of the vehicle, and
the brake lever is arranged at a left side of the steering wheel device.

* * * * *